Oct. 11, 1927.
M. SCHWARTZ
1,645,163
CONTAINER
Filed June 27, 1925
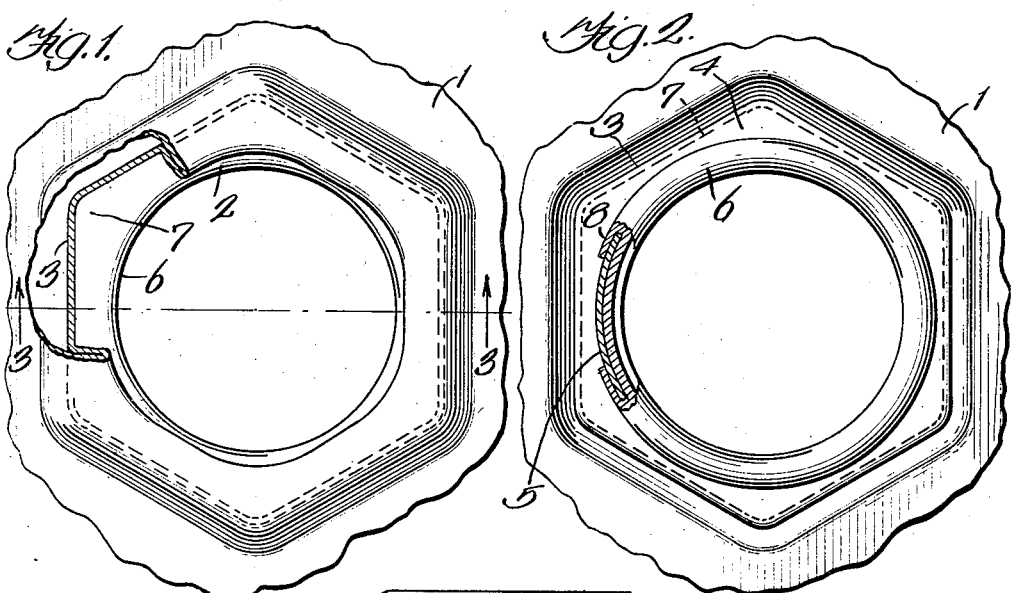
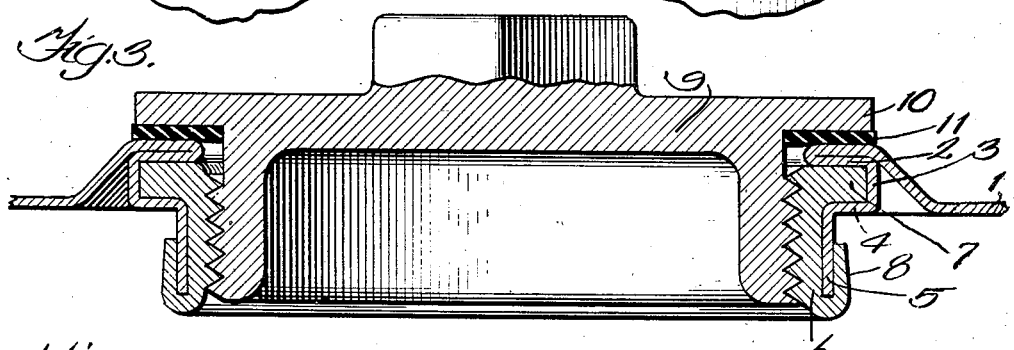
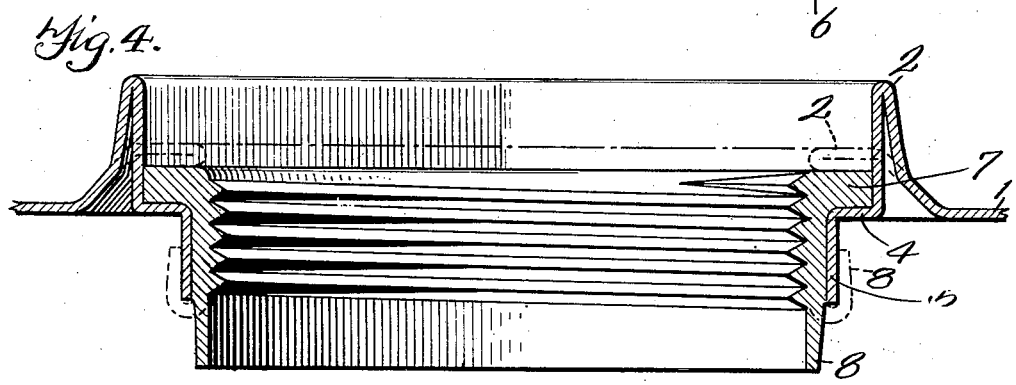
Inventor:
Morris Schwartz
By G. L. Gregg Atty.

Patented Oct. 11, 1927.

1,645,163

UNITED STATES PATENT OFFICE.

MORRIS SCHWARTZ, OF CHICAGO, ILLINOIS, ASSIGNOR TO AMERICAN FLANGE & MANUFACTURING CO., OF CHICAGO, ILLINOIS, A CORPORATION OF ILLINOIS.

CONTAINER.

Application filed June 27, 1925. Serial No. 40,023.

My invention relates to containers provided with bushings which receive closure plugs and which bushings are supported by sheet metal wall portions of the containers. The invention is of particular service in connection with barrels formed of sheet metal. It has for its object the provision of a tight union between the bushing and the container and also the provision of a closure plug to reinforce, or at least not to impair, the intimacy of the union between the bushing and container. This container may be in the form of a barrel or of other form entirely constructed of sheet metal or having a sheet metal wall portion equipped in accordance with the invention. In carrying out my invention a hole is formed through this wall portion, the part of the sheet metal surrounding the hole being bent back upon itself away from the axis of the hole to form a fold extending transversely to the axis of the hole and thence being continued along the hole axis and then toward the hole axis to form a groove.

In the preferred embodiment of the invention the sheet metal is finally continued along the hole axis to form a skirt. The bushing is formed with a flange that is received in said groove. This bushing may be exteriorly grooved to receive the aforesaid skirt portion of the wall carrying the bushing. The closure plug is screwed in the bushing and desirably has a flange which laps and presses upon the aforesaid fold formed in the sheet metal wall, the threaded portion of the bushing being desirably continued at its end opposite the flange around the skirt. Said fold prevents the plug, when tightened, from disturbing the joint between the bushing and the skirt which is received in the groove of the bushing.

The invention will be more fully explained in connection with the accompanying drawing in which Fig. 1 is a plan view of a container wall portion equipped with the bushing of my invention, the closure plug being removed, and parts of the wall portion being shown in section adjacent the bushing flange; Fig. 2 is a bottom view of the structure shown in Fig. 1 with portions shown in section; Fig. 3 is an axial sectional view of the structure shown in Figs. 1 and 2, on a larger scale, with the closure plug added; and Fig. 4 is a view illustrating some of the steps employed in assembling the bushing with the container.

I have shown a part 1 of a sheet metal portion of a container such, for example, as a barrel head. This wall portion is formed with a hole therethrough, the part of the sheet metal surrounding the hole being bent back upon itself away from the axis of the hole to form a fold extending transversely to the axis of the hole and which fold surrounds the hole, the sheet metal being thence continued along the hole axis as indicated at 3, then toward the hole axis as indicated at 4, the parts 2, 3 and 4 forming a groove which opens inwardly and constitutes an enlargement of the hole. In the preferred arrangement the sheet metal is continued from the groove side 4 along the hole axis to form a skirt 5. An annular bushing 6 is surrounded by the skirt 5 and has a flange 7 which is received in the groove defined by the sheet metal portions 2, 3 and 4.

The final step in shaping the sheet metal 1 consists in deflecting the fold at 2 from the upright position shown in Fig. 4 to the transverse position shown in Fig. 3, this step not being effected until the bushing 6 has been passed through the container wall with its flange 7 resting upon the part 4. When the bushing flange is in this position the fold at 2 is extended into its transverse position shown in Fig. 3 and by dotted lines in Fig. 4, whereby the top and bottom wall 2 and 4 of the groove receiving the flange are placed in most intimate contact with the flange to make the joint between the flange and the wall as leak proof as possible at this point. The perimeter or edge portion of the flange 7 is desirably polygonal in contour and the intermediate groove wall 3 is of similar contour whereby the bushing is held from rotation so as not to disturb the union between it and the sheet metal wall carrying it. The bushing desirably initially has the shape shown in Fig. 4 where it is illustrated with a continuation 8 beyond its threaded portion and at the other end of the bushing from the flange 7. This bushing continuation 8 is passed through the hole in the sheet metal wall, and after the bushing flange 7 is tightly held in place by the fold at 2 the bushing continuation 8 is folded outwardly and around the skirt 5 to form an annular groove receiving this skirt. The engagement between the skirt 5 and the walls of the annular groove provided upon the bushing that receive this skirt, is made as tight as possible to avoid leakage, a result which is furthered by the clamping engagement between the flange rim 7 and the groove sides 2, 4.

The closure plug 9 is screwed into the bushing. This closure plug has a flange 10 which overlaps and presses upon the fold 2, there being desirably a gasket 11 between this flange and fold to make leak proof the place of assembly of this flange and fold whereby any liquid that could possibly seep through the joints at 5 and 7, will be trapped in the space surrounded by the fold at 2, the gasket 11 and the plug 9 together with its flange 10. It will be observed that the groove 2, 3, 4, which tightly receives the bushing flange 7 holds the outwardly bent portion 8 of the bushing in fixed relation with the skirt 5, the assembly of these parts being so fixed and rigid that the clamping action of the plug flange 10 upon the gasket 11 and the underlying fold at 2 will not disturb the joint between the bushing and the skirt 5, nor the tightness of the joint between the flange 7 and the walls of the groove receiving this flange.

While the flange 7 is desirably polygonal in contour and the groove wall 3 is similarly shaped, I do not wish to be limited to this form of construction in securing holding formations upon the perimeter of the flange and the wall portion 1 at unequal distances from the axis of the hole and bushing to guard against rotation of the bushing.

Having thus described my invention, I claim:

1. A container having a sheet metal wall portion formed with a hole therethrough, the part of the sheet metal surrounding the hole being bent back upon itself away from the axis of the hole to form a fold extending transversely to the axis of the hole and thence being continued along the hole axis and then toward the hole axis to form a groove and finally along the hole axis to form a skirt; in combination with a bushing having a flange and an interiorly threaded portion which is surrounded by said skirt; and a plug screwed into said bushing and having a flange lapping and pressing upon the aforesaid fold, the threaded portion of the bushing being continued at its end opposite the flange around said skirt, the intermediate wall of said groove and the perimeter of said flange having engaging portions at unequal distances from the axis of the hole to prevent the bushing from turning.

2. A container having a sheet metal wall portion formed with a hole therethrough, the part of the sheet metal surrounding the hole being bent back upon itself away from the axis of the hole to form a fold extending transversely to the axis of the hole and thence being continued along the hole axis and then toward the hole axis to form a groove and finally along the axis of the hole to form a skirt; in combination with a bushing having a flange and an interiorly threaded portion which is surrounded and engaged by said skirt, the intermediate wall of said groove and the perimeter of said flange having engaging portions at unequal distances from the axis of the hole to prevent the bushing from turning.

In witness whereof, I hereunto subscribe my name.

MORRIS SCHWARTZ.